J. ALLEZ.
STREET CAR FENDER.
APPLICATION FILED JUNE 13, 1908.
928,575.
Patented July 20, 1909.
2 SHEETS—SHEET 2.
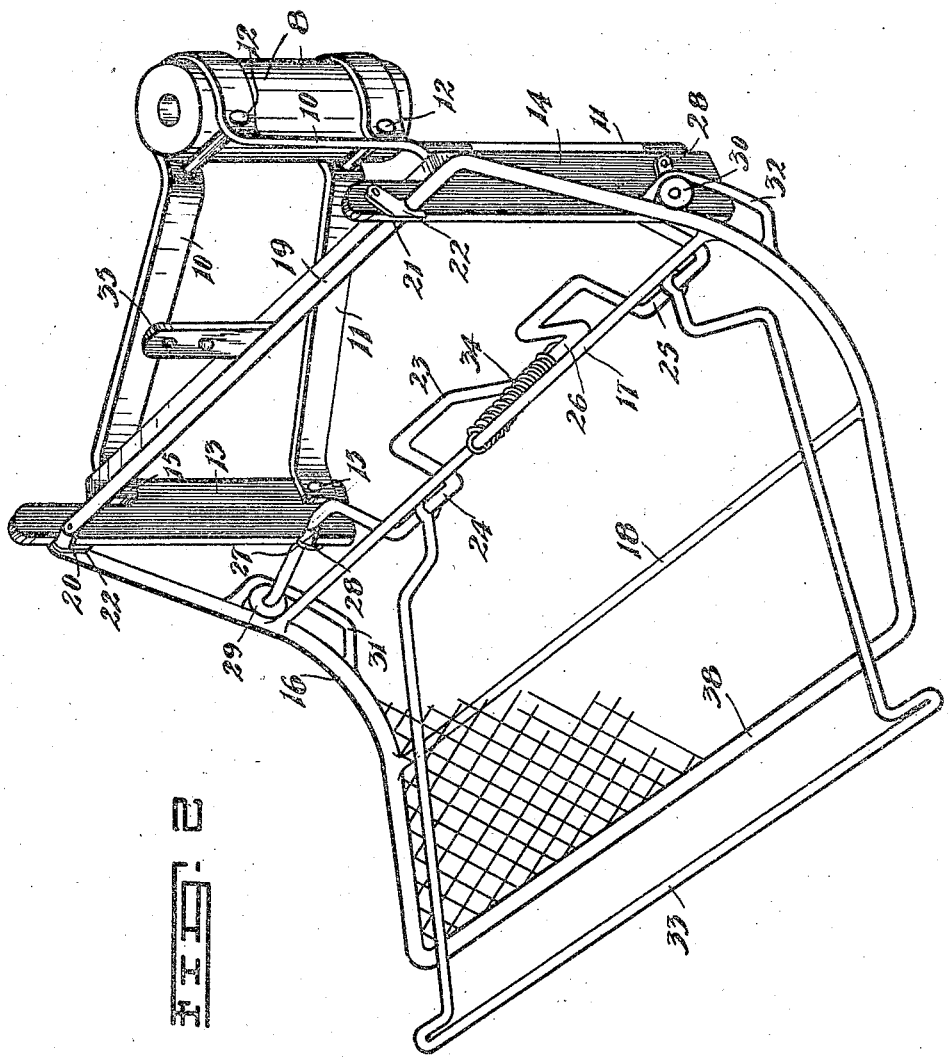
WITNESSES
INVENTOR

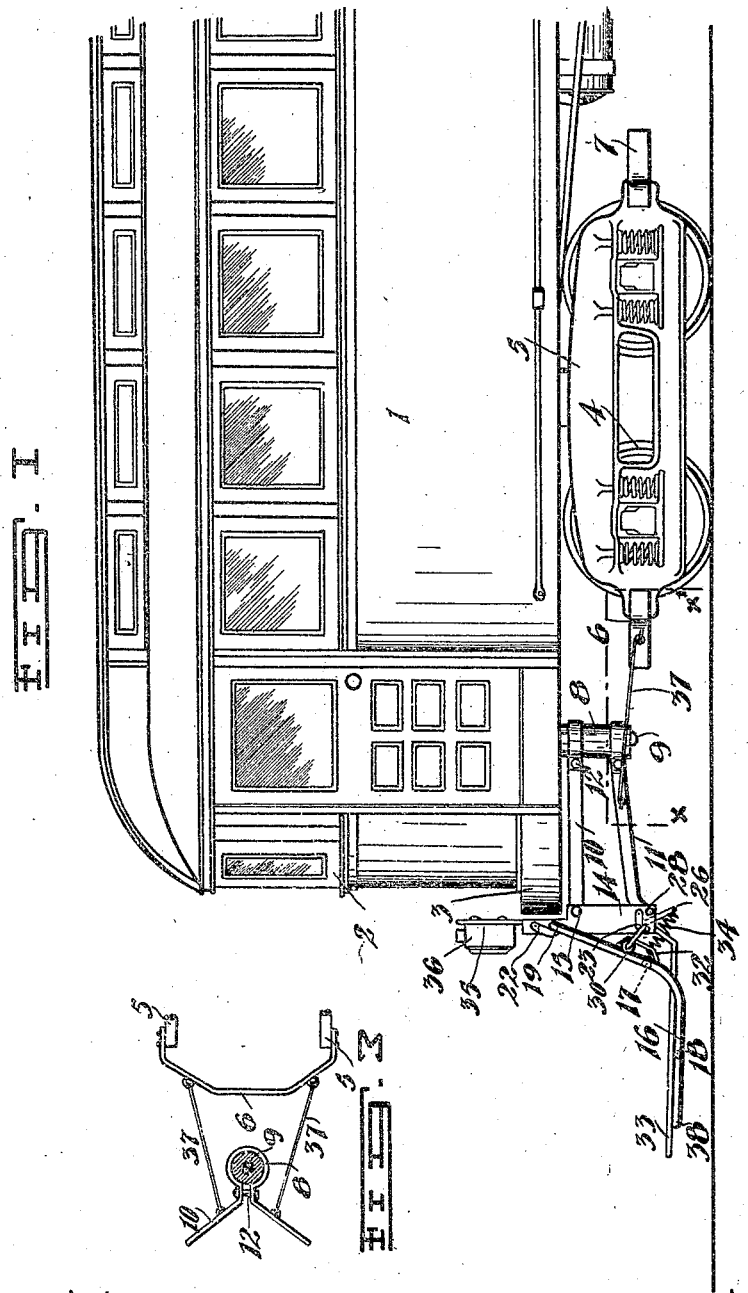

UNITED STATES PATENT OFFICE.

JAMES ALLEZ, OF WINNIPEG, MANITOBA, CANADA.

STREET-CAR FENDER.

No. 928,575.  Specification of Letters Patent.  Patented July 20, 1909.

Application filed June 13, 1908. Serial No. 438,380.

*To all whom it may concern:*

Be it known that I, JAMES ALLEZ, of the city of Winnipeg, in the Province of Manitoba, Canada, engineer, have invented certain new and useful Improvements in Street-Car Fenders, of which the following is the specification.

My invention relates to improvements in car fenders and the object of the invention is to provide a fender which will efficiently prevent an object with which it engages from passing beneath the car and which is comparatively inexpensive, strong and durable.

A further object is to provide a fender which will ride above the rails when the car is making a turn.

It consists essentially in a removable fender pivotally interconnected with a set of swingable brackets; a cross rod removably interconnected with the brackets and having eccentric cranks formed thereon and being provided at its ends with rollers operating on a track carried by the fender; a feeler extending forwardly of the fender and interconnected at its rear end with the outer set of cranks formed on the cross rods; a spiral spring passing between the central crank and the fender, and adjustable links interconnecting the brackets with the forward bar of the front trucks, the parts being arranged and constructed as hereinafter more particularly described.

Figure 1 is a side view of a car supplied with my fender. Fig. 2 is an enlarged perspective view of the fender detached from the car. Fig. 3 is a detailed section view taken along the lines X X', Fig. 1, showing the manner in which the links are connected.

In the drawings like characters of reference indicate corresponding parts in each figure.

1 represents a car of which 2 is the vestibule and 3 the floor.

4 are the front trucks of which 5 are the side frames and 6 and 7 the cross bars interconnecting the frames.

8 is a post centered on a vertical shaft 9 on which it is free to turn, the shaft being securely fastened centrally to the under face of the car floor.

10 and 11 are similar upper and lower horizontal brackets fastened centrally by bolts 12 securely to the post 8 and having their ends diverging and passing toward the front end of the car.

13 and 14 are vertical standards fastened to the flanged ends of the arms 10 and 11 respectively, by bolts 15.

16 is the fender proper, which has its framework composed of gas piping bent in the usual form and is reinforced by cross rods 17 and 18. The upper cross member 19 of the fender is designed to be received within opposing notches 20 and 21 provided in the upper end of the standards 13 and 14 where it is retained by latches 22.

23 is a cross shaft formed with three extending cranks 24, 25, and 26, those 24 and 25 passing in the same direction and that 26 at a different angle to the others. The shaft is supported by the standards within notches 27 therein provided, where it is held by latches 28. The ends of the shaft are provided with rollers 29 and 30 which pass behind the main bars of the fender and operate on guides 31 and 32 carried by the fender. It is to be noticed that the ends of the shafts on which the rollers are mounted are bent in the form of cranks so that the rollers swing in a circle concentric to the shaft 23 when the shaft is turned.

33 is a feeler which rests normally on the upper face of the fender and extends forwardly beyond it, being fastened at its ends rearwardly to the cranks 24 and 25, respectively.

34 is a spiral spring passing between the crank 26 and the rod 17.

35 is a plate secured to the upper member 19 of the fender and to this plate is fastened the usual reflecting lamp 36.

37 are links connected at their forward ends to the lower bracket 11, one at either side of the center post, and passing rearwardly and connected to the forward cross bar 6 of the trucks, it being noted that they are fastened some distance apart on this bar.

In the drawings the fender is shown in the upper or raised position and it will be seen that the rollers are at the upper ends of the guides, being so held by the tension of the spring on the crank 26 which is inclined downwardly and rearwardly, the cranks 24 and 25 being at the same time inclined downwardly and forwardly. If an obstacle be on the track it will engage, initially, with the feeler and carry it back, which motion, on account of the interconnections, throws the cranks 24 and 25 backwardly and causes the crank 26 to assume practically a horizontal position, in which position the action of the spring is neutralized by reason of crank 26 being on the dead center.

On account of the relative position of the cranks when the fender is up, it is only necessary for the feeler 33 to pass a slight distance backward to throw the fender down, for the reason that as soon as the spring and the crank 26 are in the same plane the spring will actuate the feeler of itself. If the spring be made fairly strong the fender will be actuated quickly, and it will not leave the track rails readily by the object tending to pass under it.

In order to reset the fender it is only necessary to raise the forward member 38 of the fender. This causes the rollers to return to the upper position, the spring through its tension turning the shaft 23. The feeler is thrown forward also by the turning of the shaft, as will readily be understood.

When a car is turning a corner the fender will follow the rails and not extend either to the one side or the other, as is usual. As the trucks turn with the track the links 37 cause the brackets to swing with the trucks and consequently necessitate that the fender follow the rails. The links can be provided with a threaded end and an adjusting screw, if desired.

By applying the reflecting lamp to the plate 35 it will also follow the rails, which is decidedly advantageous.

What I claim as my invention is:

1. In a device of the class described the combination with a set of supporting standards and a fender removably secured thereto, of a crank shaft carried by the standards; a feeler extending from the crank shaft forwardly beyond the fender; and rollers carried by the shaft and engaging with the fender, as and for the purpose specified.

2. In a device of the class described the combination with the supporting standards and the fender removably secured thereto, of a shaft supported by the standards and having cranks formed thereon between the standards, and its ends extending beyond the standards and turned in the form of a crank; rollers mounted on the crank ends and engaging with guides carried by the fender; and a feeler interconnected with the cranks between the standards and extending forwardly of the fender, as and for the purpose specified.

3. In a device of the class described the combination with the supporting standards and the fender removably secured thereto of a shaft removably secured in bearings formed in the standards and having a set of similarly disposed cranks between the standards, and a central crank extending at a different angle therefrom; a set of rollers mounted on the ends of the shaft, such ends being turned to form a crank; guides passing backwardly from the fender upon which the rollers operate; a feeler attached to the similarly disposed cranks and passing forwardly of the fender; and a spring interconnecting the fender with the central crank, as and for the purpose specified.

4. In a device of the class described, the combination with the car body of a fender pivotally supported therefrom, a crank shaft also supported from the car body, a feeler frame projecting beyond the fender and connected to the crank shaft, and crank arms on the crank shaft engaging the fender, substantially as described.

5. In a device of the class described, the combination with the car body and swiveled truck, of a post depending from the body in advance of the truck, brackets rotatably carried by said post and having diverging arms, a fender carried at the front of said diverging arms, and links connecting the truck with said arms, substantially as described.

6. In a device of the class described the combination with a car body and the trucks of a pivotally supported post extending downwardly from the car body and forward of the trucks; a fender forward of the car body and supported by brackets secured to the post; and links interconnecting the brackets with the trucks, as and for the purpose specified.

Signed at Winnipeg, in the Province of Manitoba, this 7th day of May, 1908.

JAMES ALLEZ.

In the presence of—
M. A. SOMERVILLE,
GERALD S. ROXBURGH.